United States Patent [19]

Chavez, Jr. et al.

[11] Patent Number: 6,125,285

[45] Date of Patent: Sep. 26, 2000

[54] WIRELESS HANDSET FOR IMPLEMENTING A VIRTUAL OFFICE

[75] Inventors: David L. Chavez, Jr., Thornton; Gary L. Griffith, Arvada; Joseph C. Rorick, Jr., Longmont, all of Colo.

[73] Assignee: Lucent Technologies Inc., Murray Hill, N.J.

[21] Appl. No.: 08/904,382

[22] Filed: Aug. 1, 1997

[51] Int. Cl.[7] .................................................. H04B 1/38
[52] U.S. Cl. ........................... 455/557; 455/556; 455/418
[58] Field of Search ........................... 455/90, 575, 348, 455/349, 351, 418, 557, 573, 556, 115, 42; 379/357, 210

[56] References Cited

U.S. PATENT DOCUMENTS

| | | | |
|---|---|---|---|
| 4,853,951 | 8/1989 | Bauer | 379/62 |
| 4,989,230 | 1/1991 | Gillig et al. | 379/59 |
| 5,010,565 | 4/1991 | Nash et al. | 379/61 |
| 5,020,090 | 5/1991 | Morris | 455/556 |
| 5,197,092 | 3/1993 | Bamburak | 379/357 |
| 5,327,486 | 7/1994 | Wolff et al. | 379/210 |
| 5,426,689 | 6/1995 | Griffith et al. | 379/58 |
| 5,446,783 | 8/1995 | May | 455/90 |
| 5,517,682 | 5/1996 | Dayani | 455/90 |
| 5,566,226 | 10/1996 | Mizoguchi et al. | 379/357 |
| 5,598,459 | 1/1997 | Haartsen | 379/58 |
| 5,625,673 | 4/1997 | Grewe et al. | 455/556 |
| 5,809,115 | 9/1998 | Inkinen | 455/557 |
| 5,839,075 | 11/1998 | Haartsen et al. | 455/450 |
| 5,873,045 | 2/1999 | Lee et al. | 455/557 |

*Primary Examiner*—William G. Trost
*Assistant Examiner*—Quochien B. Vuong
*Attorney, Agent, or Firm*—John C. Moran

[57] ABSTRACT

Assigning a wireless terminal as the only piece of telecommunication equipment for providing an individual user with full business telephone operations. The wireless terminal can be inserted into a plurality of different types of auxiliary desktop units, recognize the type of auxiliary desktop unit, and customize the displays of the auxiliary desktop unit to be that designated by the user of the wireless terminal. Each type of auxiliary desktop unit has a plurality of programmable buttons and indicators. The labels for the programmable buttons and indicators are LCD displays. The wireless terminal utilizes these LCD displays to customize the programmable buttons and indicators of the user interface for each individual user when the user's wireless terminal is in communication with the auxiliary desktop unit. This allows the user to receive the same label information regardless of the auxiliary desktop unit they are utilizing. Each user has a home auxiliary desktop unit for which they have customized their user interface. In the case where the user is utilizing a non-home auxiliary desktop unit that has fewer programmable buttons and indicators than the home unit, the wireless telephone unit displays the most relevant programmable buttons with labels. In addition, the wireless terminal unit provides the user with the option of selecting the buttons and indicators presently not displayed through the actuation of a button on the non-home auxiliary desktop unit.

26 Claims, 9 Drawing Sheets

6,125,285

WIRELESS HANDSET FOR IMPLEMENTING A VIRTUAL OFFICE

TECHNICAL FIELD

This invention relates to wireless telecommunication systems, and, in particular, to the provision of telecommunications service for individuals having a virtual office.

BACKGROUND OF THE INVENTION

In a virtual office environment, an individual spends part of their time at a home office building, part of their time at their home, and time at other locations within their company. Even when the individual is at their home office building, the individual will not always be utilizing the same desk. To further complicate matters, the various desks that will be utilized by the individual will have different types of telecommunication equipment. This is particularly true, when the individual travels to another location of their company.

In the past, similar problems were associated with computers. Many companies have resolved the computer problem by issuing all employees portable computers that can be taken from location to location and still maintain all the data of an individual.

Wireless telephones have been used to attempt to resolve the problems associated with virtual offices. However, the existing wireless telephones (wireless terminals) have not provided an adequate solution. The reason for this is that the user interface of a wireless telephone is by its nature a very compact interface. This type of interface is adequate to use in mobile type operations or for receiving simple telephone calls. However, the modern wired office telephone provides a very sophisticated and user friendly interface. The user interface of a modern office telephone allows individuals to be more effective in the performance of their jobs.

The problem that exists in the prior art then is to provide the functionality of a wired office telephone in different locations and in different office environments.

SUMMARY OF THE INVENTION

The foregoing problem is solved and a technical advance is achieved by an apparatus and method in which a wireless terminal is the only piece of telecommunication equipment that must be assigned to an individual user to provide full business telephone operations. The wireless terminal can be interconnected to a plurality of different types of auxiliary desktop units, recognize the type of auxiliary desktop unit, and customize the displays of the auxiliary desktop unit to be that designated by the user of the wireless terminal. The customized auxiliary desktop unit provides full functional capabilities of a wired business telecommunication terminal. The customization operation requires no feature changes in the wireless telecommunication switching system servicing the particular location where the customized auxiliary desktop unit is located.

Advantageously, the invention allows the user to have one telephone number for the wireless terminal, to be able to use instantly different types of auxiliary desktop units and to maintain the full functional capabilities designated by the user. A user can sit down at any desk and have the full functional capabilities that they have designated.

Advantageously, each auxiliary desktop unit will be customized to interface with the portable computer of the user.

Each type of auxiliary desktop unit has a plurality of programmable buttons and indicators. Advantageously, the labels for the programmable buttons and indicators are LCD displays. The wireless terminal utilizes these LCD displays to customize the programmable buttons and indicators of the user interface for each individual user when the user's wireless terminal is in communication with the auxiliary desktop unit. This allows the user to receive the same label information regardless of the auxiliary desktop unit they are utilizing.

Each user has a home auxiliary desktop unit for which they have customized their user interface for. In the case where the user is utilizing a non-home auxiliary desktop unit that has fewer programmable buttons and indicators than the home unit, the wireless telephone unit displays the most relevant programmable buttons with labels. In addition, the wireless terminal unit provides the user with the option of selecting the buttons and indicators presently not displayed through the actuation of a button on the auxiliary desktop unit.

In addition, the wireless terminal establishes communication with a non-home auxiliary desktop unit in a first embodiment by being physically attached to the auxiliary desktop unit. In a second embodiment, messages between the wireless terminal and the non-home auxiliary desktop unit are used to establish communication for attaching the auxiliary desktop unit to the wireless terminal.

DETAILED DESCRIPTION

Figure 1:
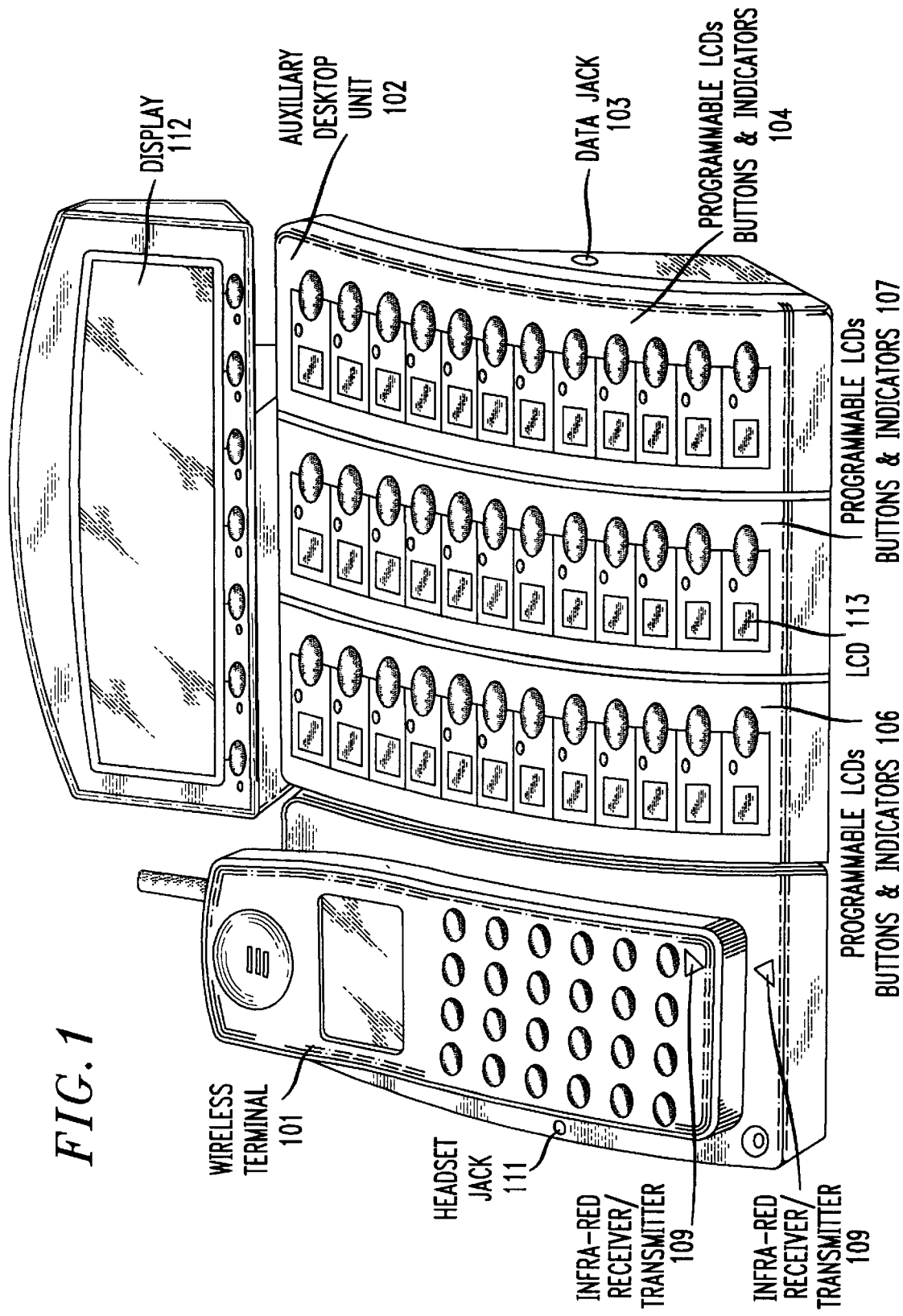
FIG. 1 illustrates a conceptual view of a wireless terminal inserted into an auxiliary desktop unit in accordance with the invention.

FIG. 1 illustrates wireless terminal 101 inserted into auxiliary desktop unit 102. All voice, data, and control information communicated between wireless terminal 101 and auxiliary desktop unit 102 is communicated by wireless terminal 101 to a wireless telecommunication switching system not illustrated in FIG. 1. Data and control information is communicated between wireless terminal 101 and auxiliary desktop unit 102 by infra-red receiver/transmitter 109 in wireless terminal 101 and infra-red receiver/transmitter 108 in auxiliary desktop unit 102. Auxiliary desktop unit 102 provides standard programmable buttons and indicators 104, 106, and 107 that are programmable to provide different telephone features and speed dialing. In addition, auxiliary desktop unit 102 provides data jack 103 which can access a remote computer via a data path through wireless terminal 101 and the wireless telecommunication switching system. Also provided, is functional display 112 that is utilized for such things as caller ID information, feature procedures, and internet access. In addition, auxiliary desktop unit 102 provides a battery charger to charge the battery of wireless terminal 101 when wireless terminal 101 is inserted into auxiliary desktop unit 102.

As will be described in greater detail later, when wireless terminal 101 comes in contact with auxiliary desktop unit 102, wireless terminal 101 recognizes that this is its home auxiliary desktop unit. Wireless terminal 101 then downloads via infrared transreceiver 109 and infrared transreceiver 108 information to configure the programmable liquid crystal display (LCD) labels such as LCD 113 of programmable LCDs, buttons, and indicators 107. The information that is downloaded from wireless terminal 101 to auxiliary desktop unit 102 was previously stored in wireless terminal 101 by the user of wireless terminal 101. In addition, wireless terminal 101 is preprogrammed to match the protocol of the user's portable computer. This allows the user to connect to data jack 103 with the portable computer and enter no information specifying the portable computer to wireless terminal 101.

Figure 4:
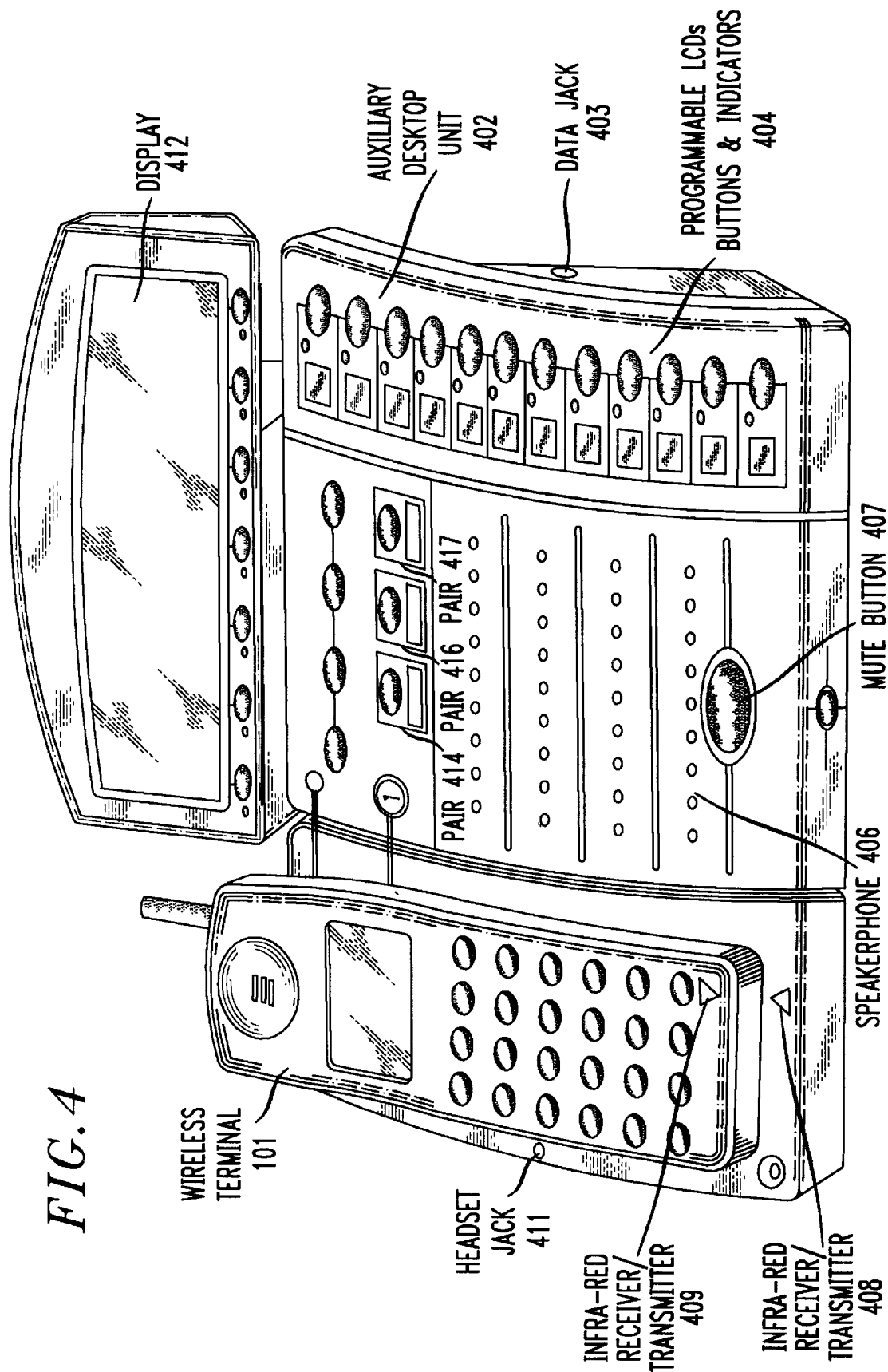
FIG. 4 illustrates a conceptual view of the wireless terminal inserted into another desktop unit in accordance with the invention.

FIG. 4 illustrates auxiliary desktop unit 402. Auxiliary desktop unit 402 is a non-home auxiliary desktop unit for wireless terminal 101. Auxiliary desktop unit 402 has only one group of programmable LCDs, buttons, and indicators (programmable LCDs, buttons, and indicators 404) but does have speakerphone 406 in place of programmable LCDs, buttons, and indicators 106 and 107. When wireless terminal 101 is inserted into auxiliary desktop unit 402, wireless terminal 101 determines the type of auxiliary desktop unit that auxiliary desktop unit 402 is. In response to this identification of type, wireless terminal 101 adjusts itself so as to work with speakerphone 406 and downloads information to configure programmable LCDs, buttons, and indicators 404 to initially be the same as programmable LCDs, buttons, and indicators 104 of FIG. 1. Should the user wish to utilize the buttons that were associated with programmable LCDs, buttons, and indicators 106 on auxiliary desktop unit 402, the user will actuate the button of LCD button pair 116. In response to this actuation, wireless is terminal 101 updates the programmable LCDs, buttons, and indicators 404 to reflect the labels and operations of the programmable LCDs, buttons, and indicators 106 of FIG. 1. LCD button pair 417 performs a similar operation with respect to programmable LCDs, buttons, and indicators 107 of FIG. 1 with respect to programmable LCDs, buttons, and indicators 404. This flexibility allows the user to maintain the full flexibility of auxiliary desktop unit 102 on auxiliary desktop unit 402 which has fewer programmable LCDs, buttons, and indicators. However, when wireless terminal 101 is in contact with auxiliary desktop unit 402, the user does have the use of speakerphone 406.

Figure 2:
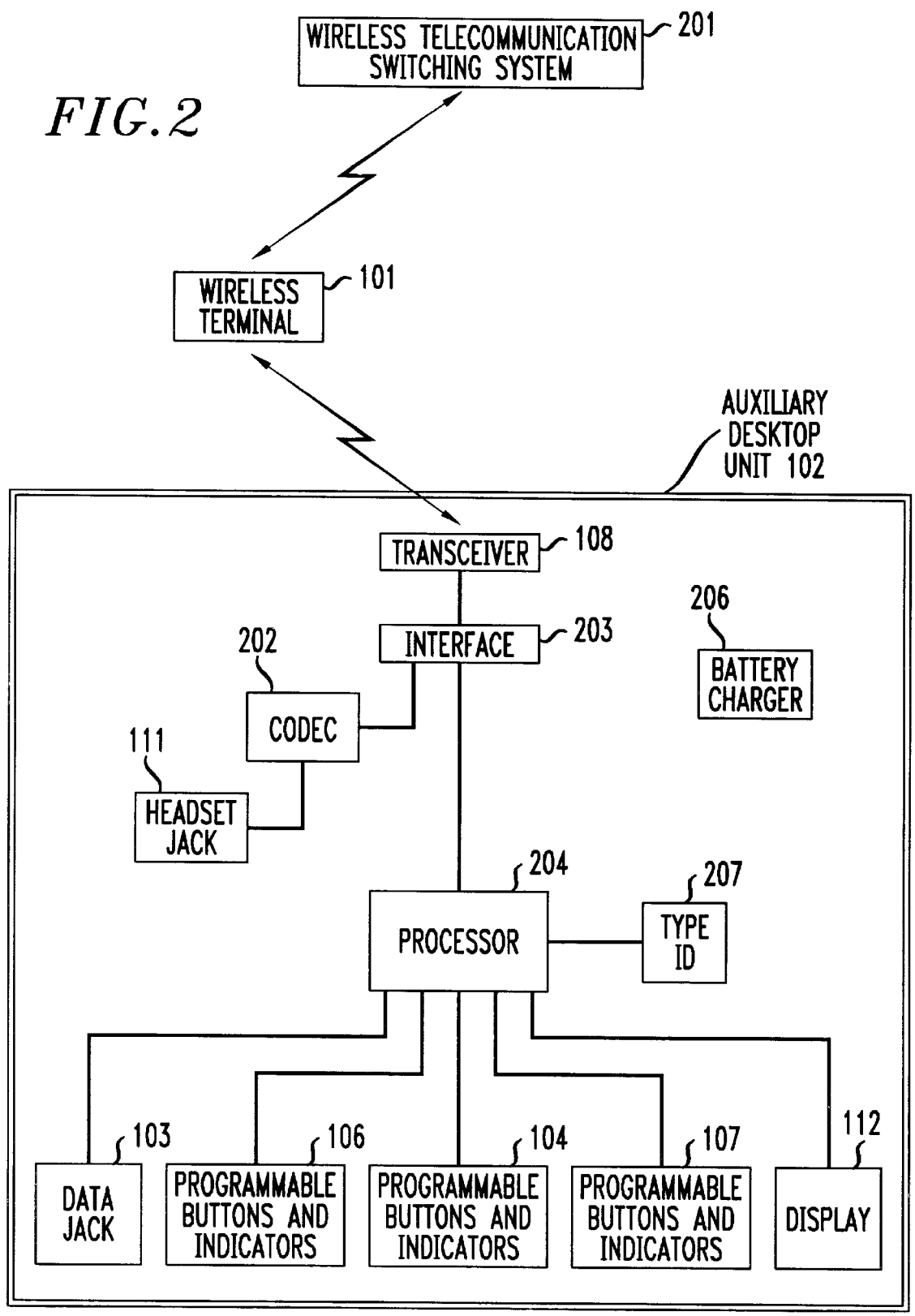
FIG. 2 illustrates, in block diagram form, the interconnection of the wireless terminal to a wireless telecommunication switching system and also to an auxiliary desktop unit.
Figure 3:
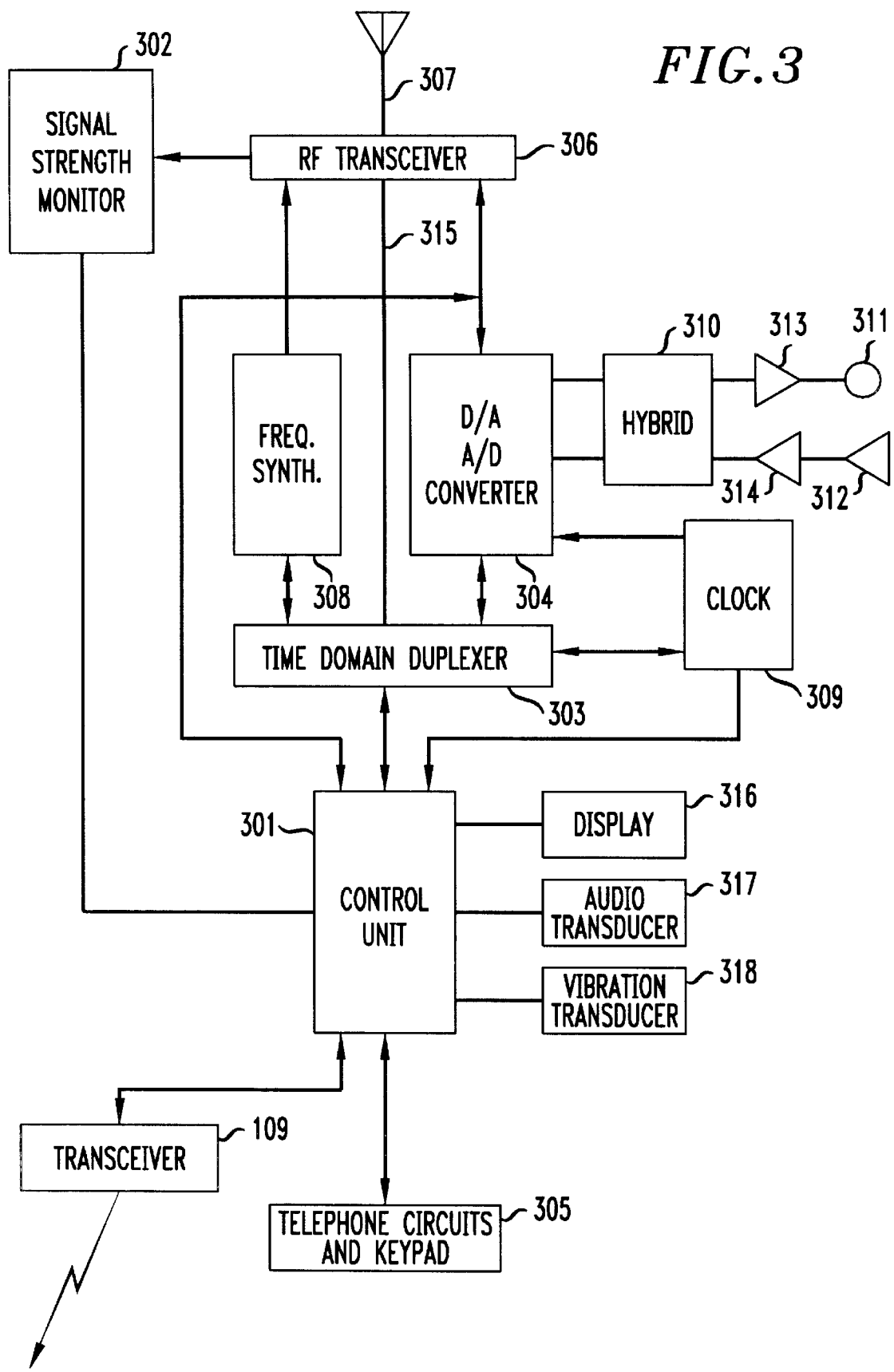
FIG. 3 illustrates, in block diagram form, a wireless terminal.

FIG. 2 illustrates a block diagram illustrating the interconnection between wireless telecommunication switching system 201, wireless terminal 101, and auxiliary desktop unit 102. Auxiliary desktop unit 102 is shown in greater detail in FIG. 2. Wireless terminal 101 is shown in greater detail in FIG. 3. Wireless terminal 101 performs all the call control and high level processing of messages from wireless telecommunication switching system 201. Wireless telecommunication switching system 201 is unaware of whether wireless terminal 101 is operating by itself or is communicating with auxiliary desktop unit 102. Communication of information between wireless terminal 101 and auxiliary desktop unit 102 is via infra-red transceivers 108 and 109. One skilled in the art could readily envision other types of wireless links. Wireless terminal 101 maintains a control channel, a voice channel, and a data channel with auxiliary desktop unit 102 via the infra-red link. The protocol used on the infra-red link can be any number of well known protocols. Within auxiliary desktop unit 102, interface 203 disassembles and assembles information being communicated on the infra-red link set up between transceivers 108 and 109. The voice information is routed to or from voice codec 202 for use by a headset plugged into headset jack 111. Data information is routed to or from a data device connected on data jack 103. Control information is communicated by interface 203 with processor 204. The control information is utilized by processor 204 to control the operations of display 112 and the LCDs and indicators on subunits 104, 106, and 107. Actuation of a programmable button causes processor 204 to transmit control information via interface 203, transceiver 108, and transceiver 109, to wireless terminal 101. Wireless terminal 101 is responsive to this control information to form a high level PHS message that specifies which programmable button has been actuated. Similarly, wireless telecommunication switching system 201 transmits control information to wireless terminal 101 specifying which indicator on auxiliary desktop unit 102 is to be turned on via a high level PHS message. Wireless terminal 101 decodes the PHS message from wireless telecommunication switching system 201 and sends a message via the control channel of the infra-red link to processor 204 specifying that the indicator is to be lit. Wireless telecommunication switching system 201 processes the control information from auxiliary desktop unit 102 to provide features and other telephony operations using techniques well understood by those skilled in the art.

When wireless terminal 101 is remote from auxiliary desktop unit 102 and is not maintaining communication via the infra-red link, wireless terminal 101 maintains a record of the messages sent from wireless telecommunication switching system 201 designating which indicators are to be turned on or off. Upon establishing communication with auxiliary desktop unit 102, wireless terminal 101 transmits messages to processor 204 updating the status of the indicators. Similarly, wireless terminal 101 upon reestablishing communication updates display 1 12. Whether wireless terminal 101 is in communication with auxiliary desktop unit 102 or not, wireless telecommunication switching system 201 communicates control information with wireless terminal 101 in the same way. Advantageously, no feature operations need be modified to add wireless terminal 101 and auxiliary desktop unit 102 to wireless telecommunication switching system 201. As will be described with respect to FIG. 4, wireless terminal 101 provides similar operations when contact is established with a non-home auxiliary desktop unit. Wireless handset 101 is illustrated in greater detail in FIG. 3. Wireless handset 101 implements a wireless protocol that allows wireless handset 101 to maintain a wireless signal link with wireless telecommunication switching system 201 via base stations included in wireless telecommunication switching system 201. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless handset is provided by control unit 301.

Units 302, 303, 306, 307, 308, and 309 provide the RF communication capabilities for the wireless handset. Elements 304, 310, and 311–314 provide the audio information received and transmitted to the user; whereas, elements 316–318 and 305 provide the basic user interface.

The data and voice information is transmitted or received directly from RF transceiver 306 by control unit 301 and is communicated with auxiliary desktop unit 102 via transceiver 109. One skilled in the art could readily see that this information could be directly received by transceiver 109 from RF transceiver 306. Transceiver 109 would then form this information into the two data channels assigned to communication of voice and data information on the infra-red link. Note, that in the PHS protocol, control unit 301 would have to request one or more bearer channels to provide a channel for the data information that was being communicated with wireless telecommunication switching system 201. It is well known by one skilled in the art how these additional bearer channels are obtained in the PHS protocol.

Control unit 301 is responsive to control messages received from wireless telecommunication switching system 201 to extract the INFO elements that define what indicators are to be controlled and the information to be displayed on display 112. Control unit 301 then communicates this information to processor 204 via the infra-red link. Similarly, control unit 301 is responsive to messages from processor 204 defining button actuations on auxiliary desktop unit 102 to encode this information into INFO elements of PHS messages and to transmit those messages to wireless telecommunication switching system 201. In addition, control unit 301 continuously monitors whether or not it is in communication with processor 204. If control unit 301 is in communication with processor 204, it sends control information for the indicators and display received from wireless telecommunication switching system 201 to processor 204. In addition, control unit 301 continuously stores the status of the display and indicators of auxiliary desktop unit 102. If control unit 301 is not in communication with processor 204, it continues to store information. When communication is established with processor 204, the stored information is communicated to processor 204 so that it can properly update the display and indicators.

The advantage of controller 301 operating in this manner is that the system controller of wireless telecommunication system 201 does not have to be programmed to take into account when auxiliary telephone unit 102 is in communication with wireless terminal 101. More importantly, the system controller of wireless telecommunication system 201 does not have to maintain a record and then update auxiliary telephone unit 102. Controller 301 is not only programmed to properly update the display and indicators of auxiliary telephone unit 102 but also using well-known techniques processor 301 updates the display of wireless terminal 101.

Figure 5:
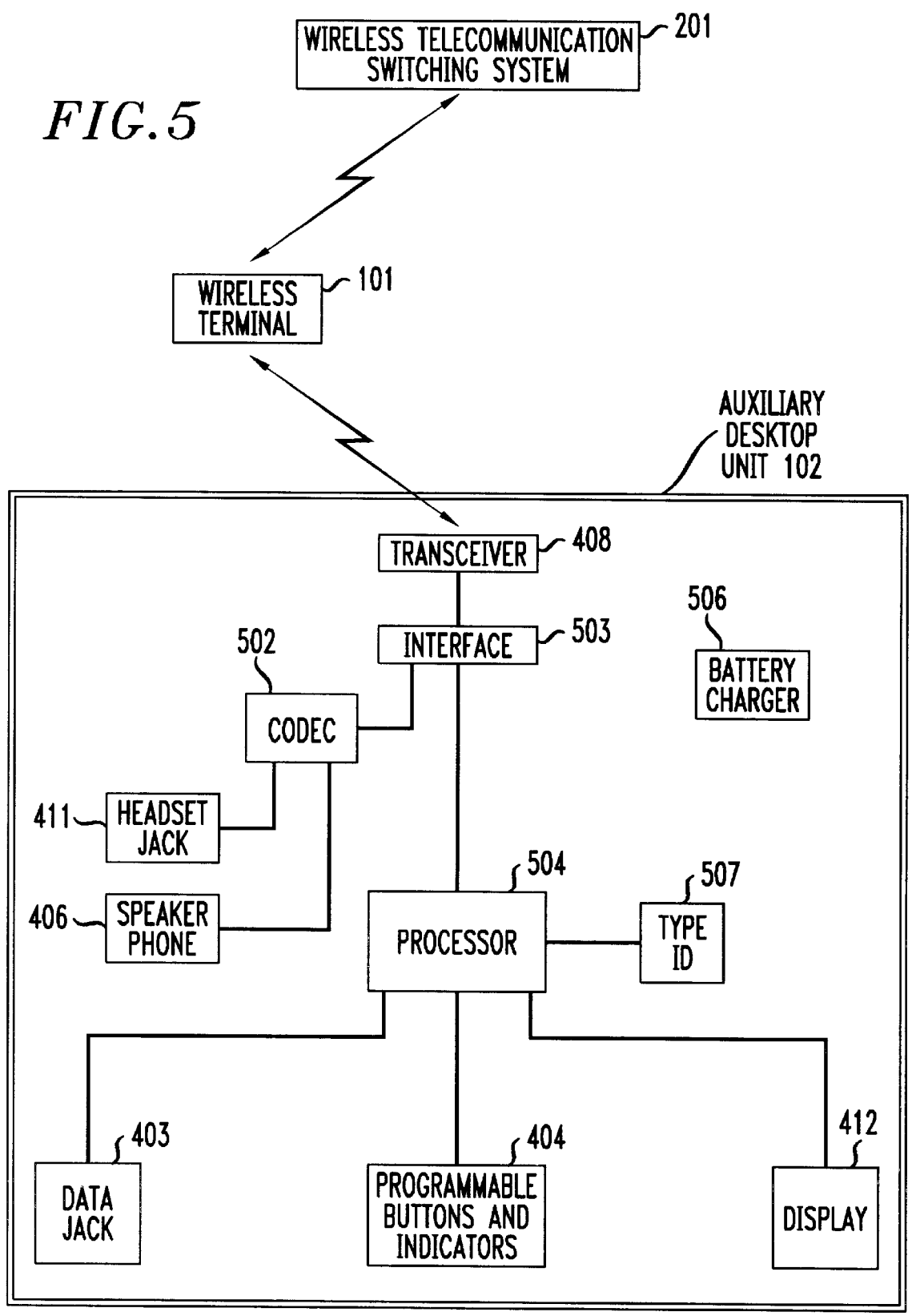
FIG. 5 illustrates, in block diagram form, the interconnection of the wireless terminal to the wireless telecommunication switching system and another auxiliary desktop unit.

FIG. 5 illustrates, in block diagram form, the internal composition of auxiliary desktop unit 402 of FIG. 4. Auxiliary desktop unit 402 is similar to auxiliary desktop unit 102 of FIG. 2 with the exception that speakerphone 106 has been added so that it can receive or transmit voice information via codec 502 as can headset jack 511. In addition, only programmable buttons and indicators 404 are present. Also, the auxiliary desktop unit type generated by type ID block 207 is different.

Figure 6:
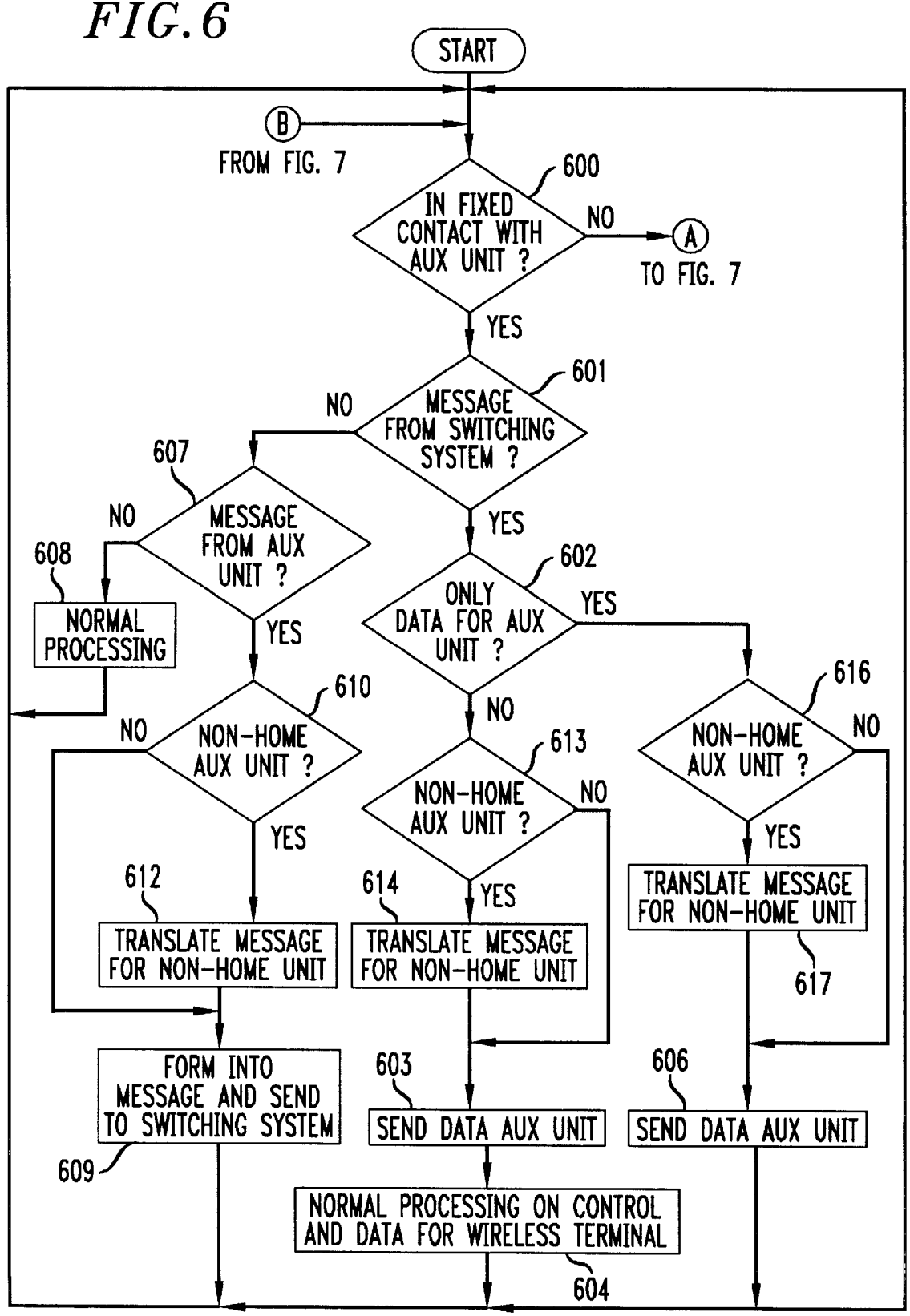
FIGS. 6, 7 and 8 illustrate, in flow chart form, steps performed by a wireless terminal.
Figure 7:
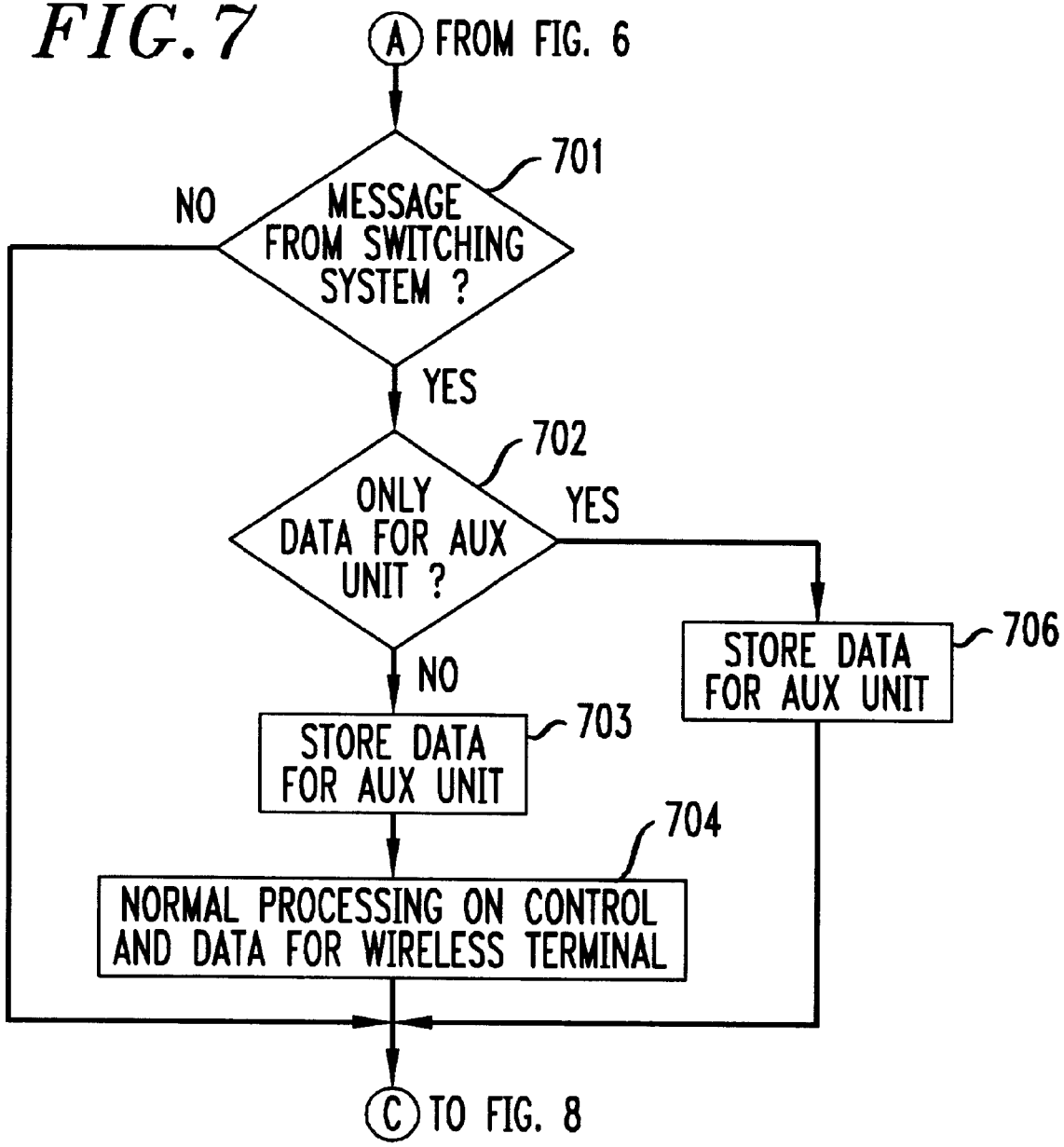
Figure 8:
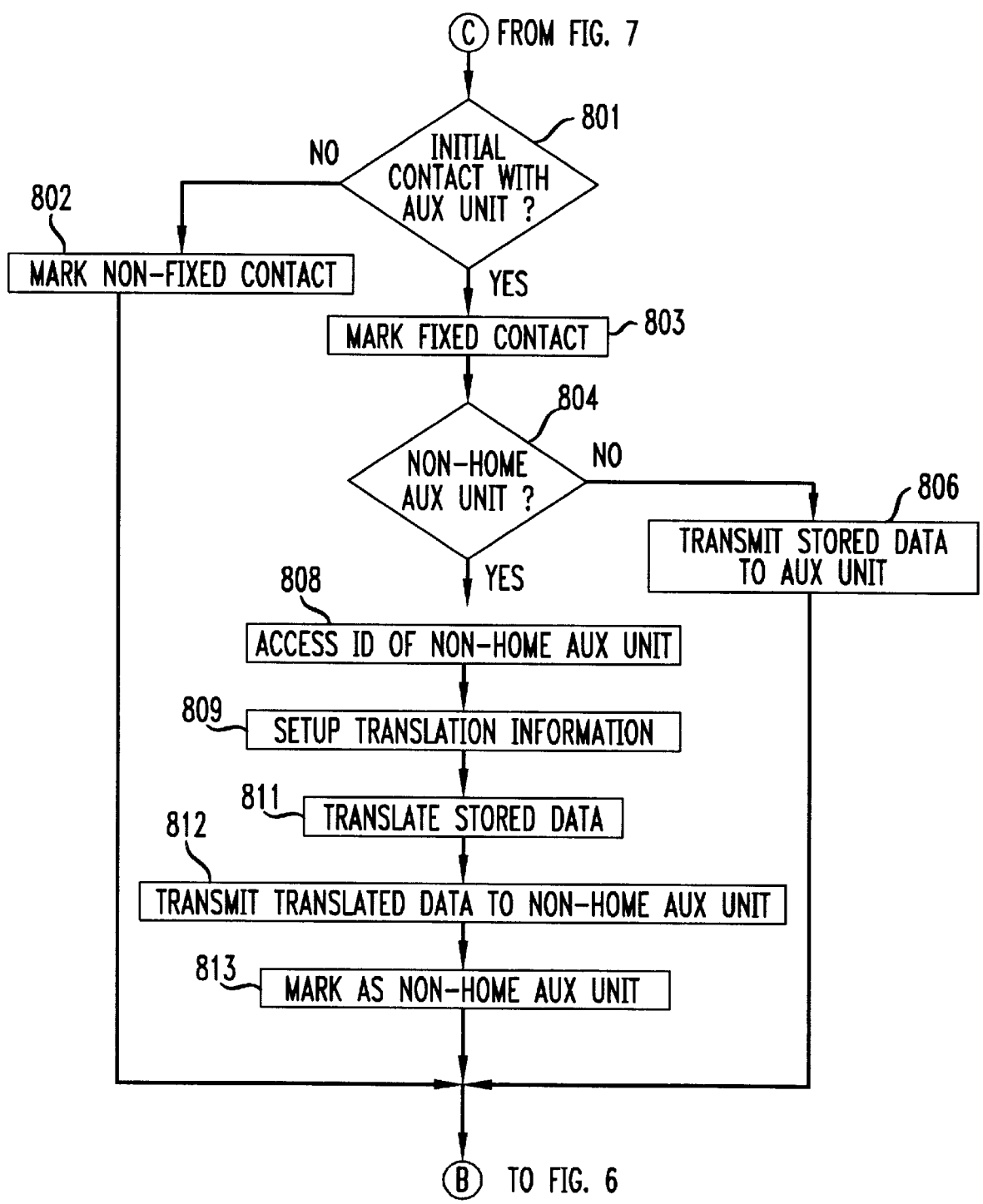

FIGS. 6, 7, and 8 illustrate the steps performed by a wireless terminal. Decision block 600 determines if the wireless terminal is in fixed contact with the auxiliary desktop unit. Fixed contact means that contact via the infra-red link had been previously established after having been lost. If the answer is yes, control is transferred to decision block 601 which determines if there is a message from the wireless telecommunication switching system. If the answer is yes, decision block 602 determines whether this message contains data that is only intended to control some function on the auxiliary desktop unit. Such data would be contained within a INFO element. If the answer in decision block 602 is yes, control is transferred to decision block 616. Decision block 616 determines if the wireless terminal is in contact with its home auxiliary desktop unit or in contact with a non-home auxiliary desktop unit. If the answer is yes, control is transferred to block 617. Block 617 will look up in the translation table to determine how the information contained within the INFO element is to be handled. Depending upon the configuration of the non-home auxiliary desktop unit, no action may be taken with respect to the non-home auxiliary desktop unit, in which case block 606 will send a null message to the auxiliary desktop unit. After the determination has been made in block 617 on what information is to be sent to the non-home auxiliary desktop unit, control is transferred to block 606 which does the actual transmission of the information to the auxiliary desktop unit. If the answer in decision block 616 is no, the data contained in the INFO element is transmitted to the auxiliary desktop unit by block 606 before returning control to decision block 600.

If the answer in decision block 602 is no, control is transferred to decision block 613. The actions performed by decision block 613 and block 614 are similar to those performed by decision block 616 and block 617 as previously described. However, after execution of block 614, control is transferred to block 603. If the answer in decision block 613 is no, any data destined for the auxiliary desktop unit is transmitted to the auxiliary desktop unit by block 603. Block 604 then performs normal processing of control and data intended for utilization by the wireless terminal before returning control to decision block 600.

Returning to decision block 601, if the answer is no, decision block 607 determines if there is a message from the auxiliary desktop unit. If the answer is no, block 608 performs normal processing before returning control to decision block 600. If the answer in decision block 607 is yes, the information in the message from auxiliary desktop unit 609 is formed into INFO elements of a message which is sent to the wireless telecommunication switching system before returning control to decision block 600.

Returning to decision block 600, if the wireless terminal is not in fixed contact with the auxiliary desktop unit, control is transferred to decision block 701 of FIG. 7. Decision block 701 determines if there is a message from the wireless telecommunication switching system. If the answer is yes, decision block 702 determines if the message consists of data intended only for the auxiliary desktop unit. If the answer is yes in decision block 702, block 706 stores the data for the auxiliary desktop unit and transfers control to decision block 801 of FIG. 8. The stored data will be transmitted to the auxiliary desktop unit when initial contact is made with the auxiliary desktop unit. These operations are described with respect to blocks 801–813 of FIG. 8-. Returning to decision block 702, if the answer is no, block 703 stores any data in the message that was intended for the auxiliary desktop unit before transferring control to block 704. The latter block performs normal processing on any control and data that was intended for the wireless terminal.

After execution of block 704 or block 706, control is transferred to decision block 801 of FIG. 8 which determines if initial contact has been established with the auxiliary desktop unit. If the answer is yes, block 803 marks the fact that fixed contact has now been established with the auxiliary desktop unit before transferring control to decision block 804. The latter decision block determines if the initial contact has been made with a non-home auxiliary system. If the answer is no, decision block 804 transfers control to block 806 which transmits the stored data to the home auxiliary desktop unit before returning control to decision block 600 of FIG. 6. If the decision in decision block 804 is yes, control is transferred to block 808 which obtains the type identification from the non-home auxiliary desktop unit. Block 809 then utilizes the type identification to set up the translation information. Then, block 811 utilizes this translation information to translate the stored data, and block 812 transmits the translated stored data to the non-home auxiliary desktop unit. Finally, block 813 marks the fact that a non-home auxiliary desktop unit is being utilized before transferring control back to decision block 600 of FIG. 6.

If the answer in decision block 801 is no, block 802 marks that non-fixed contact is present with respect to the auxiliary desktop unit before transferring control to decision block 600 of FIG. 6.

Returning to decision block 701 of FIG. 7, if the answer in decision block 701 is no, control is transferred to decision block 801 of FIG. 8.

Figure 9:
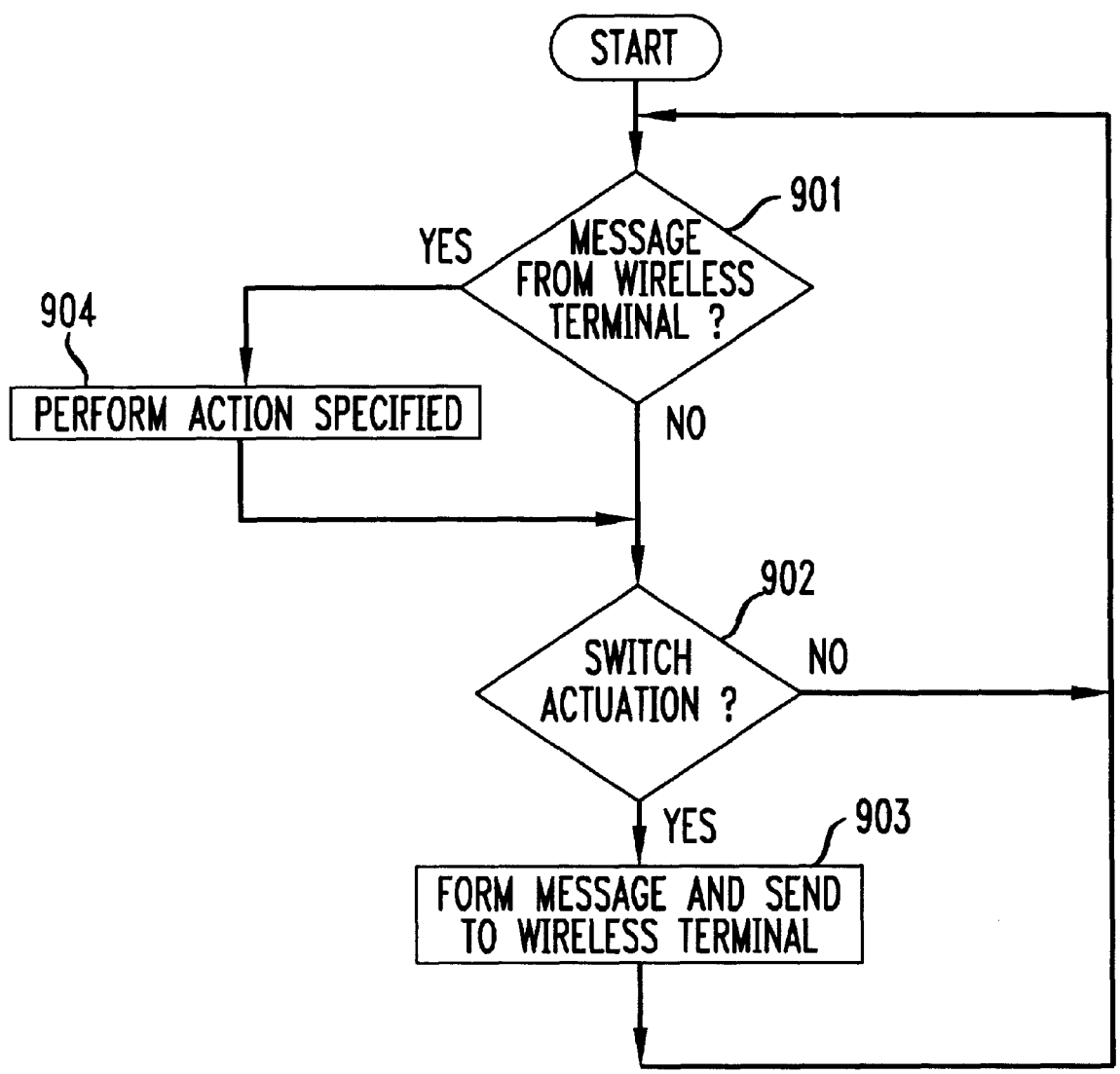
FIG. 9 illustrates, in flow chart form, steps performed by an auxiliary desktop unit.

FIG. 9 illustrates the steps performed by processor 204 of auxiliary desktop unit 102. Decision block 901 determines if a message has been received from the wireless terminal. If the answer is no, control is transferred to decision block 902. If the answer is yes in decision block 901, control is transferred to block 904 which performs the action specified in the message before transferring control to decision block 902. Decision block 902 determines if there has been any type of switch actuation on the auxiliary desktop unit. If the answer is no, control is transferred back to decision block 901. If the answer is yes in decision block 902, block 903 forms a message specifying the switch actuation and sends this message to the wireless terminal before transferring control back to decision block 901.

Of course, various changes and modifications to the illustrative embodiments described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. A wireless terminal for providing user dependent location telecommunication functions on a plurality of auxiliary fixed units and mobile functions on the wireless terminal via a wireless switching system; comprising:

a controller responsive to a first wireless connection with a first one of the plurality of auxiliary fixed units for providing a user defined set of telecommunication feature functions to the first one of the plurality of auxiliary fixed units with all telecommunication information to and from the first one of the plurality of auxiliary fixed units being communicated via the first wireless connection and the wireless terminal; and the controller responsive to a second wireless connection with a second one of the plurality of auxiliary fixed units for providing a subset of the user defined set of telecommunication feature functions wherein the subset is determined by the telecommunication feature function capabilities of the second one of the plurality of auxiliary fixed units with all telecommunication information to and from the second one of the plurality of auxiliary fixed units being communicated via the second wireless connection and the wireless terminal where an appearance of the second one of the plurality of auxiliary fixed units is configured to be similar to an appearance of the first one of the plurality of auxiliary fixed units when the first one of the plurality of auxiliary fixed units is providing the user defined set of telecommunication feature functions.

2. The wireless terminal of claim 1 wherein the controller further responsive to a message from the second one of the plurality of auxiliary fixed units during the wireless second connection for providing another subset of the user defined set of telecommunication feature functions.

3. The wireless terminal of claim 2 wherein the controller further responsive to an initial wireless connection with one of the plurality of auxiliary fixed units for requesting an identification code from the one of the plurality of auxiliary fixed units; and the controller further responsive to receipt of the identification code for determining the configuration and telecommunication feature functions of the one of the plurality of auxiliary fixed units.

4. The wireless terminal of claim 1 wherein the controller responsive to absence of a wireless connection with any of one of the plurality of auxiliary fixed units for providing mobile functions.

5. The wireless terminal of claim 3 wherein the controller responsive to wireless control messages from the wireless switching system for translating the wireless control messages to ones of a first type of messages during the first wireless connection;

the wireless terminal further comprises a transmitter for transmitting the ones of the first type of messages to the first one of the plurality of auxiliary fixed units;

the controller responsive to the wireless control messages for translating the wireless control messages to a subset of the ones of the first type of messages during the second wireless connection; and the transmitter further transmitting the subset of the ones of the first type of messages to the second one of the plurality of auxiliary fixed units.

6. The wireless terminal of claim 5 wherein the controller responsive to receipt of ones of a third type of messages from the first one of the plurality of auxiliary fixed units for transmitting other wireless control messages to the wireless switching system; and the controller responsive to receipt of the ones of the third type of messages from the second one of the plurality of auxiliary fixed units for transmitting a subset of the other wireless control messages to the wireless switching system.

7. The wireless terminal of claim 6 wherein the first and second wireless connections are infra-red links.

8. An apparatus providing both mobile and location telecommunication services via wireless switching system, comprising:

a plurality of auxiliary fixed units for providing a plurality of telecommunication feature functions with each of the plurality of auxiliary fixed units having different subsets of the plurality of telecommunication feature functions;

a wireless terminal for connecting to the wireless switching system via a first wireless link and to a first one of the plurality of auxiliary fixed units via a first one of a plurality of second wireless links;

a first controller in the wireless terminal responsive to first ones of telecommunication control messages from the wireless switching system for transmitting ones of a second type of control messages to the first one of the plurality of auxiliary fixed units via the first one of a plurality of second wireless links upon being in contact with the first one of the plurality of auxiliary fixed units;

a second controller in the first one of the plurality of auxiliary fixed units responsive to the ones of the second type of control messages for controlling the subset of the plurality of telecommunication feature functions of the first one of the plurality of auxiliary fixed units;

a transceiver in the wireless terminal for detecting loss of the first one of the plurality of second wireless links and contact with a second one of the plurality of auxiliary fixed units via a second one of the plurality of second wireless links;

the first controller further responsive to the detection by the receiver for transmitting a subset of the ones of the second type of control messages to the second one of the plurality of auxiliary fixed units wherein the subset of the ones of the second type of control messages matches the subset of the plurality of telecommunication feature functions of the second one of the plurality of auxiliary fixed units; and a third controller in the second one of the plurality of auxiliary fixed units responsive to the subset of the ones of the second type of control messages for controlling the subset of the plurality of telecommunication feature functions of the second one of the plurality of auxiliary fixed units.

9. The apparatus of claim 8 wherein the second controller of the first one of the plurality of auxiliary fixed units responsive to actuation of other ones of the plurality of telecommunication feature functions by a user of the first one of the plurality of auxiliary fixed units for transmitting ones of a third type of control messages to the wireless terminal;

the first controller responsive to the ones of the third type of control messages for transmitting second ones of the telecommunication control messages to the wireless switching system;

the third controller of the second one of the plurality of auxiliary fixed units responsive to actuation of a subset of the other ones of the plurality of telecommunication feature functions by a user on the second one of the plurality of auxiliary fixed units for transmitting a subset of the ones of a third type of control messages to the wireless terminal; and the first controller responsive to the subset of the ones of the third type of control messages for transmitting a subset of the second ones of the telecommunication control messages to the wireless switching system.

10. The apparatus of claim 9 wherein the transceiver further determining no contact with any of the plurality of auxiliary fixed units; and the first controller responsive to no contact and receipt of third ones of telecommunication control messages from the wireless switching system for storing other ones of the second type of control messages.

11. The apparatus of claim 10 wherein the transceiver further detecting the restoration of the first one of the plurality of second wireless links and the first controller responsive to the detect ion of restoration the first one of the plurality of second wireless links for transmitting the stored other ones of the second type of control messages to the first one of the plurality of auxiliary fixed units; and the transceiver further detecting the restoration of the second one of the plurality of second wireless links and the first controller responsive to the detection of restoration of the second one of the plurality of second wireless links for transmitting the subset of the stored other ones of the second type of control messages to the second one of the plurality of auxiliary fixed units.

12. The apparatus of claim 11 wherein the first one of the plurality of auxiliary fixed units is assigned to the user of the wireless terminal and the subset of the plurality of telecommunication feature functions of the second one of the auxiliary fixed units is defined by the subset of the plurality of telecommunication feature functions of the first one of the auxiliary fixed units.

13. The apparatus of claim 12 wherein the wireless terminal responsive to audio information from the wireless switching system for communicating the audio information via each of the plurality of wireless links that is interconnecting a one of the plurality of auxiliary fixed units having audio operations and responsive to voice information received via the plurality of wireless links for communicating the received audio information to the wireless switching system.

14. The apparatus of claim 13 wherein each of the plurality of auxiliary fixed units has an individual identification code and the first controller responsive to initial contact with each of the plurality of auxiliary fixed units for requesting the identification code of each of the plurality of auxiliary fixed units; and each of the plurality of auxiliary fixed units responsive to the request for the identification code from the first controller for transmitting the identification code of each of the plurality of auxiliary fixed units to the wireless terminal.

15. The apparatus of claim 14 wherein the second one of the plurality of auxiliary fixed units has an auxiliary audio device and the first controller responsive to the identification code of the second one of the plurality of auxiliary fixed units for utilizing the auxiliary audio device when contact is made with the second one of the plurality of auxiliary fixed units.

16. The apparatus of claim 14 wherein the first controller further responsive to the identification code from the second one of the plurality of auxiliary fixed units for configuring the subset of the plurality of telecommunication feature functions of the second one of the plurality of auxiliary fixed units to be similar in operations to the subset of telecommunication feature functions of the first one of plurality of auxiliary fixed units.

17. The apparatus of claim 16 wherein each of the plurality of auxiliary fixed units comprises programmable label displays and the first controller further configuring the programmable label displays of the second one of the plurality of auxiliary fixed units to have a similar content as the programmable label displays of the first one of the plurality of auxiliary fixed units when in contact with the wireless terminal.

18. The apparatus of claim 17 wherein there are fewer programmable label displays on the second one of the plurality of auxiliary fixed units than on the first one of the plurality of auxiliary fixed units and the first controller further responsive to the identification code of the second one of the plurality of auxiliary fixed units for configuring the content of the programmable label displays of the second one of the plurality of auxiliary fixed units to be similar to a first subset of the programmable label displays of the first one of the plurality of auxiliary fixed units.

19. The apparatus of claim 18 wherein the first controller further responsive to actuation of a switch on the second one of the plurality of auxiliary fixed units for configuring the content of programmable label displays of the second one of the plurality of auxiliary fixed units to be similar to a second subset of the programmable label displays of the first one of the plurality of auxiliary fixed units.

20. A method for providing user dependent location telecommunication functions on a plurality of auxiliary fixed units and mobile functions on a wireless terminal by the wireless terminal via a wireless switching system; comprising the steps of:

providing a user defined set of telecommunication feature functions to a first one of the plurality of auxiliary fixed units in response to a first wireless connection with the first one of the plurality of auxiliary fixed units with all telecommunication information to and from the first one of the plurality of auxiliary fixed units being communicated via the first wireless connection and the wireless terminal; and providing a subset of the user defined set of telecommunication feature functions to a second one of the plurality of auxiliary fixed units in response to a second wireless connection with the second one of the plurality of auxiliary fixed units wherein the subset is determined by the telecommunication feature function capabilities of the second one of the plurality of auxiliary fixed units with all telecommunication information to and from the second one of the plurality of auxiliary fixed units being communicated via the second wireless connection and the wireless terminal where an appearance of the second one of the plurality of auxiliary fixed units is configured to be similar to an appearance of the first one of the plurality of auxiliary fixed units when the first one of the plurality of auxiliary fixed units is providing the user defined set of telecommunication feature functions.

21. The method of claim 20 further comprises the step of providing another subset of the user defined set of telecommunication feature functions in response to a message from the second one of the plurality of auxiliary fixed units during the wireless second connection.

22. The method of claim 21 further comprises the steps of requesting an identification code from the one of the plurality of auxiliary fixed units in response to an initial wireless connection with one of the plurality of auxiliary fixed units; and determining the configuration and telecommunication feature functions of the one of the plurality of auxiliary fixed units in response to receipt of the identification code.

23. The method of claim 20 further comprises the step of providing mobile functions in response to absence of a wireless connection with any of one of the plurality of auxiliary fixed units.

24. The method of claim 22 further comprises the steps of translating wireless control messages received from the wireless switching system to ones of a first type of messages during the first wireless connection;

transmitting the ones of the first type of messages to the first one of the plurality of auxiliary fixed units;

translating the wireless control messages to a subset of the ones of the first type of messages during the second wireless connection; and transmitting the subset of the ones of the first type of messages to the second one of the plurality of auxiliary fixed units.

25. The method of claim 24 further comprises the steps of transmitting other wireless control messages to the wireless switching system in response to receipt of ones of a second type of messages from the first one of the plurality of auxiliary fixed units; and transmitting a subset of the other wireless control messages to the wireless switching system in response to receipt of the ones of the second type of messages from the second one of the plurality of auxiliary fixed units.

26. The method of claim 25 wherein the first and second wireless connections are infra-red links.

* * * * *